Figure 1:
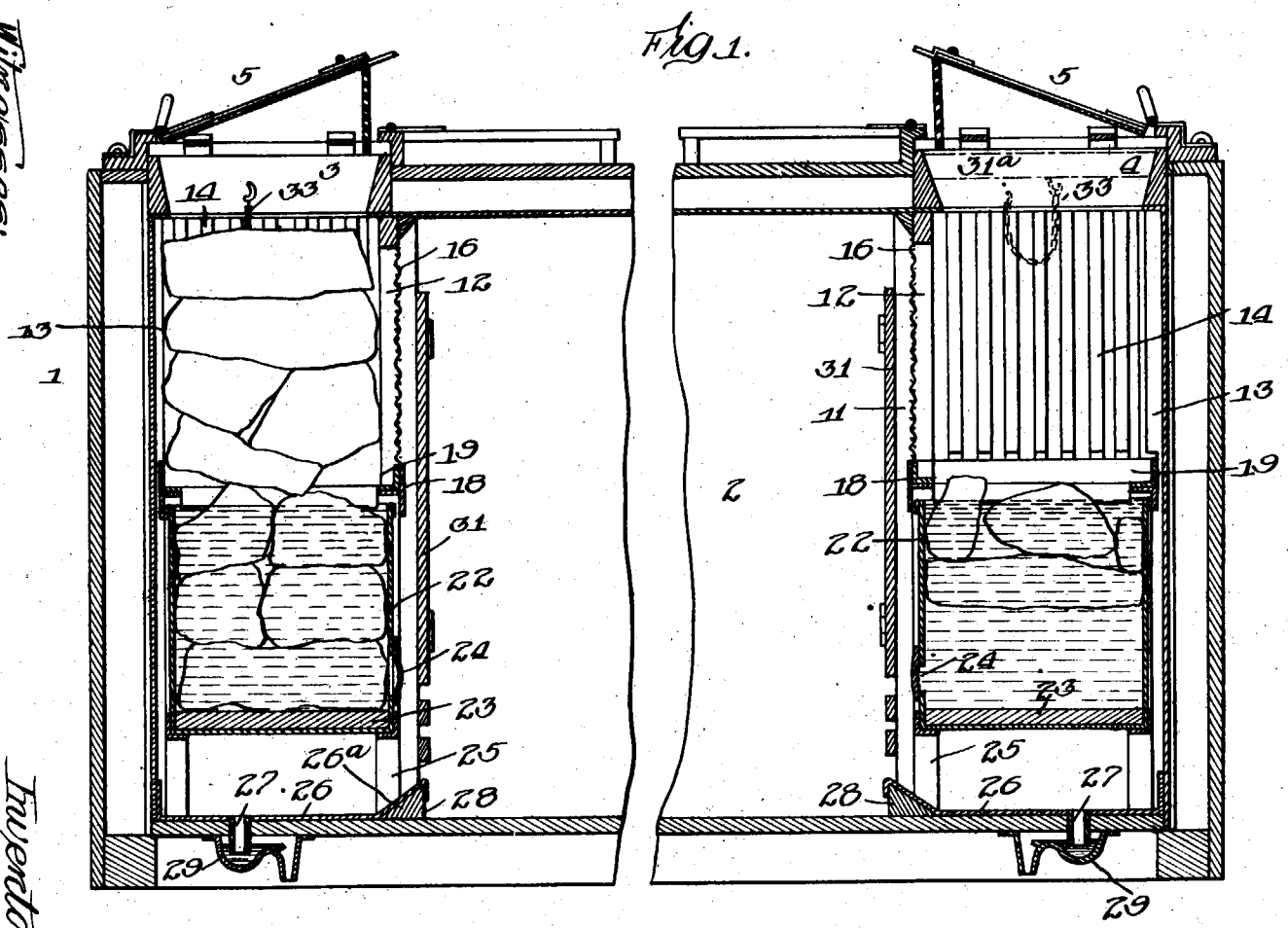

No. 12,630. REISSUED APR. 9, 1907.

O. M. STIMSON.

COMBINED FREEZER AND REFRIGERATOR CAR.

APPLICATION FILED FEB. 1, 1907.

4 SHEETS—SHEET 1.

Witnesses:
Lillian Prentice
Katharine Sulach

Inventor:
Oscar M. Stimson
By Peirce & Fisher
Attorneys

THE NORRIS PETERS CO., WASHINGTON, D. C.

No. 12,630. REISSUED APR. 9, 1907.

O. M. STIMSON.

COMBINED FREEZER AND REFRIGERATOR CAR.

APPLICATION FILED FEB. 1, 1907.

4 SHEETS—SHEET 2.

Witnesses:
Lillian Prentice
Katherine Gerlach

Inventor:
Oscar M. Stimson
By Pierce & Fisher
Attorneys.

THE NORRIS PETERS CO., WASHINGTON, D. C.

No. 12,630. REISSUED APR. 9, 1907.

O. M. STIMSON.

COMBINED FREEZER AND REFRIGERATOR CAR.

APPLICATION FILED FEB. 1, 1907.

4 SHEETS—SHEET 3.

Witnesses:
Lillian Prentice
Katharine Sulach

Inventor:
Oscar M. Stimson
By Pierce & Fisher
Attorneys

THE NORRIS PETERS CO., WASHINGTON, D. C.

No. 12,630. REISSUED APR. 9, 1907.

O. M. STIMSON.

COMBINED FREEZER AND REFRIGERATOR CAR.

APPLICATION FILED FEB. 1, 1907.

4 SHEETS—SHEET 4.

Witnesses:
Lillian Prentice
Katherine Sulach

Inventor:
Oscar M. Stimson
By Peirce & Fisher
Attorneys.

THE NORRIS PETERS CO., WASHINGTON, D. C.

UNITED STATES PATENT OFFICE.

OSCAR M. STIMSON, OF CHICAGO, ILLINOIS.

COMBINED FREEZER AND REFRIGERATOR CAR.

No. 12,630. Specification of Reissued Letters Patent. Reissued April 9, 1907.

Original No. 833,648, dated October 16, 1906. Application for reissue filed February 1, 1907. Serial No. 355,331.

*To all whom it may concern:*

Be it known that I, OSCAR M. STIMSON, a citizen of the United States, residing at Chicago, in the county of Cook and State of Illinois, have invented new and useful Improvements in a Combined Freezer and Refrigerator Car, of which the following is a specification.

This invention relates to a combined freezer and refrigerator car; and the object thereof is to set up a car in a manner as hereinafter set forth which is particularly adapted for freezing or for refrigerating purposes and when used for either of such purposes it will not be necessary to change the interior form of the car in any manner.

Although the invention is especially designed for use in connection with railway-cars, yet it is adapted for any usages wherein it is found applicable—for example, cold-storage or house-refrigerators.

By way of explanation it might be well to state that there are to-day in service two or more special cars which are required to meet the varying conditions when transporting perishable products and which may be termed a "refrigerator-car" and a "freezer-car." The refrigerator-car is provided with ice-boxes adapted to receive the ice and by which a temperature from 35° to 50° can be maintained, and the freezer-car, which is used largely for hauling fresh meat, poultry, and other fresh and frozen packing-house products, requiring a temperature of 35° and less. The freezer-car requires an especial equipment, which cannot be ventilated, and which is not entirely successful as the refrigerator-car referred to, for the reason that in the freezer-car the ice receptacles or chambers are entirely inclosed, which they must of course be in order to carry the brine accumulated from melting ice and salt.

Primarily the object of this invention is to combine the two hereinbefore-mentioned cars into one, so that it will not be necessary to change the interior construction of the car for freezing or for refrigerating purposes.

A further object of the invention is to construct a combined freezer and refrigerator car which shall be simple in its construction, strong, durable, efficient in its use, embodying into one car all the advantages of a freezer and refrigerator car, and comparatively inexpensive to set up.

With the foregoing and other objects in view the invention consists of the novel construction, combination, and arrangement of parts hereinafter more specifically described, and illustrated in the accompanying drawings, wherein is shown the preferred embodiment of the invention; but it is to be understood that changes, variations, and modifications can be resorted to which come within the scope of the claims hereunto appended.

In the drawings which form a part of this specification, like reference characters denote corresponding parts throughout the several views, and in which—

Figure 2:
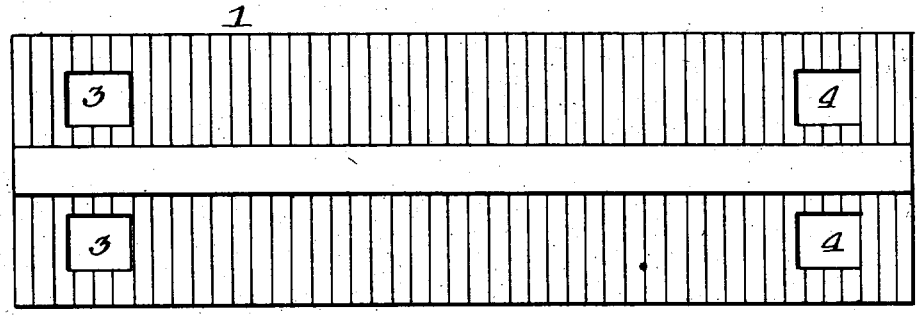
Figure 4:
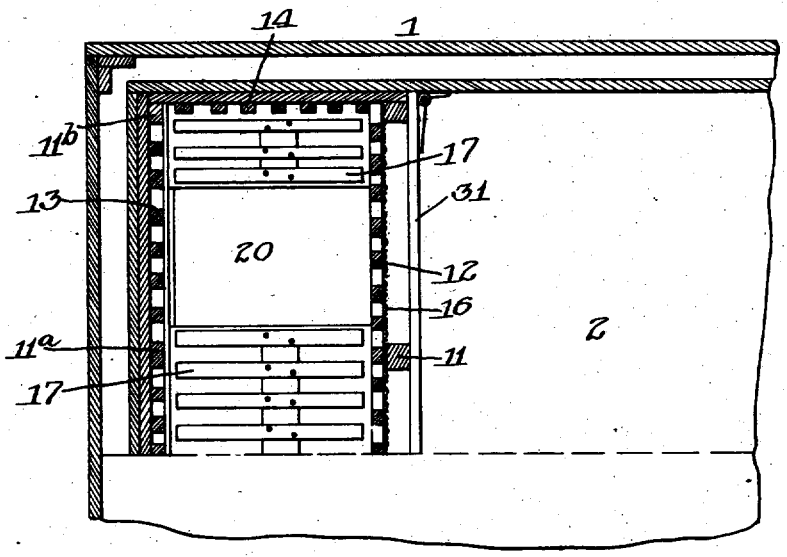
Figure 3:
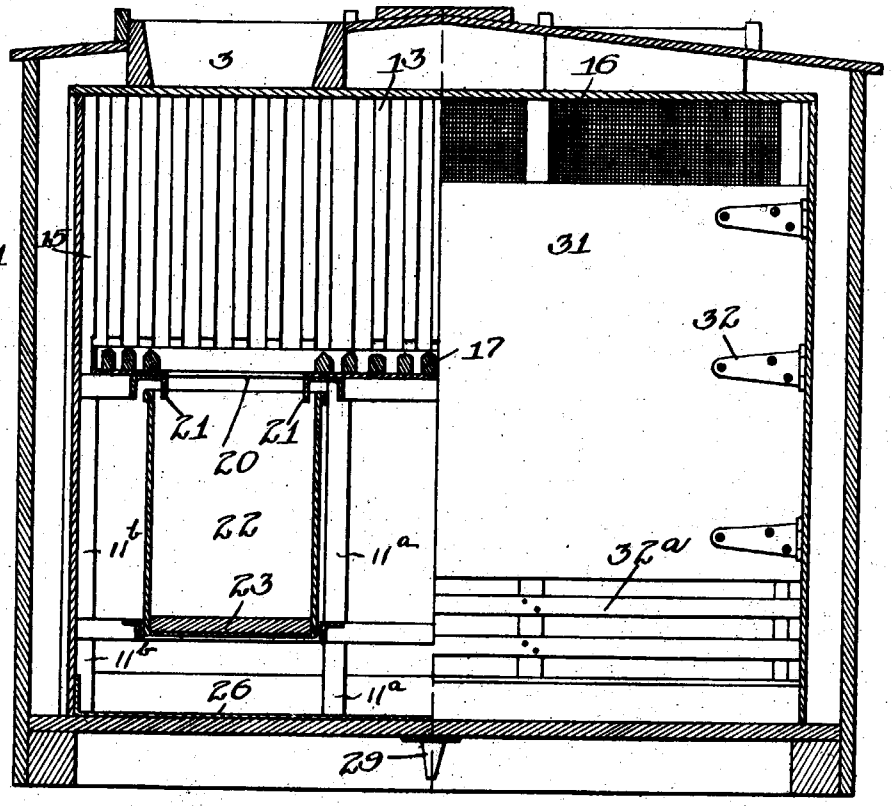
Figure 5:
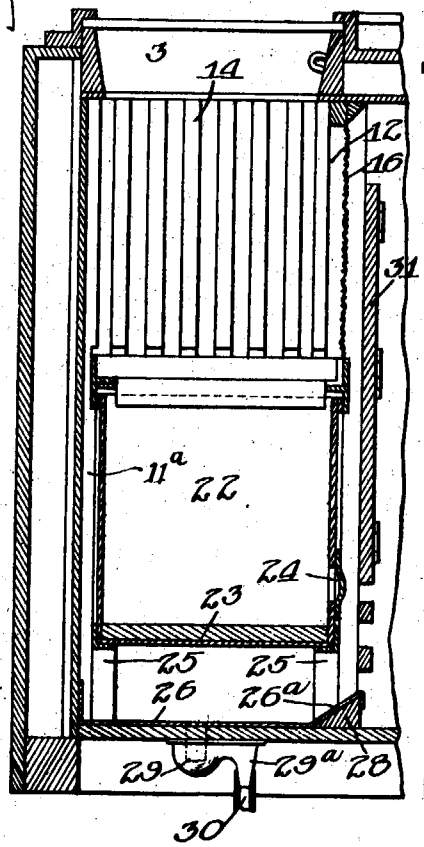
Figure 6:
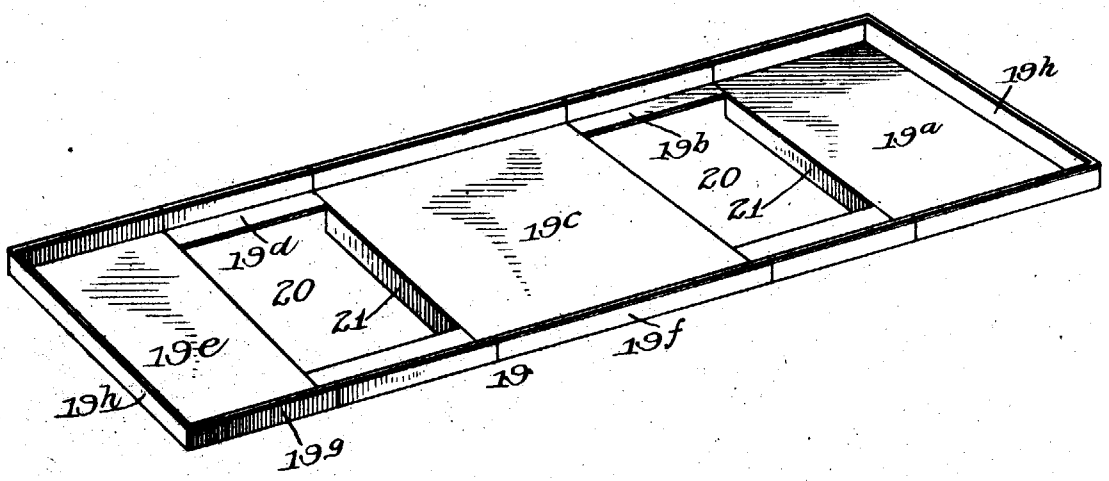

Figure 1 is a longitudinal sectional view of a car broken away in accordance with this invention. Fig. 2 is a top plan. Fig. 3 is a transverse section. Fig. 4 is a sectional plan. Fig. 5 is a longitudinal section of the car broken away, and Fig. 6 is a detail of the conductor-pan.

Referring to the drawings by reference characters, 1 denotes a car, and 2 the loading-chamber thereof. The top of the car at each end is provided with a pair of hatch-openings, (one pair indicated by the reference character 3 and the other pair by the reference character 4.) These hatch-openings allow of loading the ice-boxes, to be hereinafter referred to. Arranged over each of the hatch-openings is a suitable ventilator 5. This ventilator can be dispensed with, if desired; but it is preferable to provide the car with a plurality of ventilators, so that when occasion requires the car can be ventilated. At each end of the car, at a point removed from the end wall thereof, a plurality of uprights 11 are fixed in position, and thereby form rectangular spaces below the hatch-openings, said spaces being substantially equal to the width of the car, and within each of the said rectangular spaces is arranged an ice-box, a conductor-pan for the ice-box, one or more ice-tanks, (as shown, two,) and the drip-pan. The specific construction of each ice-box, tank, conductor-pan, and drip-pan will now be referred to.

The ice-boxes have the width and breadth thereof substantially equal to the width and breadth of the said rectangular spaces, and each of the ice-boxes is provided with a slatted front wall 12, a slatted rear wall 13, and slatted side walls 14 15. The slatted walls are formed of upright bars or members suitably spaced apart. The upright members designated $11^a$ and $11^b$ of the rear wall extend the full height of the car, while the other upright members of the rear wall 13 and those of the front and side walls 14 and 15 extend from the top of the car downwardly to the central conductor-pan 19, hereafter described. (See Figs. 3 and 5.) The slatted front wall 12 has secured to the outer face thereof a wire screen 16 or a perforated metallic sheet, which provides an additional cooling-surface and, furthermore, prevents small pieces of ice falling into the loading-chamber. At the lower ends of the upright members of the front, side, and rear walls longitudinally-extending grate-bars 17 are provided and which constitute the bottom of the ice-box. These bars 17 may be of any suitable construction and are arranged in separate series in such a manner that one series will be spaced apart from another series for a purpose to be hereinafter referred to, and the said bars of each series are suitably spaced apart.

The bars 17 are supported by the conductor-pan, to be hereinafter referred to, and the said conductor-pan is mounted upon the supports 18, these latter being in the form of T-irons and are secured to the uprights 11 and the vertically-extending members $11^a$ $11^b$ of the rear wall 13. The uprights 11 and vertically-extending members $11^a$ $11^b$ are mortised to receive the supports 18, as clearly shown in Fig. 5. The bars 17 not only constitute the bottom of the ice-box, but also act as a means to protect the conductor-pan, as will be evident.

The conductor-pan is indicated by the reference character 19, is substantially rectangular in contour, and of a width and breadth equal to the width and breadth of the ice-box. The said conductor-pan 19 is formed of a series of sections $19^a$ $19^b$ $19^c$ $19^d$ $19^e$. The sections $19^b$, $19^c$, and $19^d$ are provided with vertical flanges $19^f$, which extend in a longitudinal direction, and the sections $19^a$ and $19^e$ are not only provided with the longitudinally-extending flanges $19^g$, similar to the flanges $19^f$, but are further provided with the laterally-extending flanges $19^h$. By such construction when the sections are set up to constitute the drip-pan the same is provided with a vertical marginal flange extending entirely around the same. The sections $19^b$ and $19^f$ are cut away, so as to provide the conductor-pan with a pair of openings 20, and the said sections $19^b$ and $19^h$ are each provided with a depending flange 21. The function of the conductor-pan 19 is to collect the drippings from the ice-box and direct them into the tank. The conductor-pan, as shown, is provided with two openings 20; but it is evident that only one opening may be employed. The upright members of the front and side walls are cut away at their lower ends, so as to overhang the flanges of the conductor-pan.

The ice-tanks are indicated by the reference character 22. One or more of these ice-tanks may be employed—as shown, two, for the reason that the conductor-pan is provided with a pair of openings. If the conductor-pan be provided with but one opening, one ice-tank is employed. Each of the ice-tanks 22 consists of a receptacle having closed sides, a closed bottom, and an open top, and the said tanks 22 are arranged below the openings 20 of the conductor-pan 19 and below the space formed between two series of grate-bars. The tanks 22 are not connected to the conductor-pan, but are arranged a suitable distance below said pan, thereby permitting of the tanks overflowing. The tanks 22 are somewhat narrower than the conductor-pan and are provided with wooden bottoms 23 to protect the tank from falling ice, and on the front or on one side of each of the tanks, near the bottom thereof, a handhold 24 is formed to permit of cleaning the tanks when so required. Supports 25 are provided for the tanks 22, and these supports 25 are adapted to have the tanks 22 seat thereon and are of such height as to elevate the tanks a suitable distance above the floor of the car. Owing to the arrangement of the tanks 22 with respect to the ice-box, it will be seen that the drippings from the melting ice in the ice-box are conveyed into the said tanks, thus carrying the drippings, which are of course very cold, until the benefit of the temperature has been obtained. When the tanks shall have become full of the drippings, they will overflow and escape down the outside of the tank into the drip-pan 26.

The drip-pan 26 is constructed of suitable metallic material of a width equal to the width of the car positioned below the ice-tanks 22 and has its forward end projecting upwardly at an inclination, as at $26^a$, and the said inclined portion $26^a$ is supported upon the member 28, which is secured to the floor of the car. The inclined portion $26^a$ of the drip-pan constitutes a means to arrest the drippings and overflow from the tanks flowing out upon the floor of the car. The drip-pan 26 has communicating therewith a drain-pipe 27. These latter open into a trap 29, carried by the bottom of the car. The outlet $29^a$ of the trap 29 communicates with a pipe 30, which is of such length as to convey the salt or the brine drippings to a point below the metal-work of the car-truck, so as to prevent injury thereto.

Positioned forwardly of the uprights 11 is a solid door 31 of such height as to partially inclose the front wall of the ice-box and to partially inclose a portion of the space in which is arranged the tanks 22, and owing to the height and arrangement of the door 31, as shown, the retarding of the circulation is prevented. The door 31 is hinged, as at 32, and below the bottom of the door 32 horizontally-extending slats 32[a] are provided, which are suitably spaced apart and secured to the uprights 11.

Each of the hatch-openings is closed through the medium of a plug 31[a], which when the car is ventilated is adapted to drop down into the ice-box. The plugs are connected to the top of the car by the chains 33.

The tanks 22 are not used solely as drip-collectors, for the reason that they form an essential part of the ice-storage, as the top openings of these tanks are not covered by the grate-bars, but the tanks open directly into the upper section of the ice-chamber. Therefore when the ice-box is being filled with ice it is evident that the ice will also fall into the ice-tank. The dimensions of the tanks 22 are such that the tanks can be employed for the use of either caked or crushed ice, and the arrangement of the tanks is such that it is necessary to first fill them with either caked or crushed ice before it is possible to fill the ice-box.

For medium temperature no salt or similar substance is used, yet the melting of the ice will naturally in time fill the tanks, which is a desirable feature even when medium temperature is required, but an actual necessity when a freezing temperature is required, and obtained by the use of salt or other similar substance and by collecting and holding the brine.

The tanks are in time filled with water or brine as the ice melts, and in time the remaining ice in the tanks will necessarily float on the top of the water. Consequently it will thereby be brought to a higher point in the car or near where the air enters the refrigerating-chamber. In addition these tanks by overflowing provide an extra large cooling-surface for the descending air-current. When the car is to be ventilated, the ventilating devices are opened, the plugs of the hatch-openings removed, and the air can then enter through the hatch-openings at one end of the car and pass out of the hatch-openings at the other end of the car.

Having thus fully described my invention, what I claim as new, and desire to secure by Letters Patent, is—

1. The combination with a refrigerating-chamber, of an ice-box having openings in the front thereof, thereby establishing direct communication between the interior of the chamber and the ice-box, said box further provided with an enlarged opening in its bottom, and an ice-receiving and overflow tank having closed sides, bottom and an open uninterrupted top arranged directly below the said opening in the bottom of the ice-box, said tank having its top edge positioned at a point removed from the lower face of the bottom of the ice-box, thereby allowing the overflow from the tank to be discharged between the top edge of the walls of the tank and the bottom of the ice-box.

2. The combination with a refrigerating-chamber, of an ice-box having openings in the front, rear and sides thereof, thereby establishing direct communication between the interior of the chamber and the ice-box, said box further provided with an enlarged opening in its bottom, and an ice-receiving and overflow tank having closed sides, bottom and an open uninterrupted top and arranged directly below the said opening in the bottom of the ice-box, said tank having its top edge positioned at a point removed from the lower face of the bottom of the ice-box, thereby allowing the overflow from the tank to be discharged between the top edge of the walls of the tank and the bottom of the ice-box.

3. In combination, an ice-box having the rear, front and side walls thereof provided with openings and its bottom formed with bars spaced apart by openings, the open space between two of the said bars being of greater area than the open spaces between the other of the bars; and an ice-receiving and overflow tank having an open uninterrupted top arranged directly below said enlarged open space between two of the said bars, the top edge of said tank being positioned at a point removed from the lower face of the bottom of the ice-box, thereby permitting the overflow from the tank to be discharged between the top edge of the walls of the tank and the bottom of the ice-box.

4. In combination, an ice-box having its bottom formed with a series of bars spaced apart by openings, each series being separated from the other by an enlarged open space, and an ice-receiving and overflow tank having an open uninterrupted top arranged directly below each of said enlarged open spaces and at a point removed from the lower face of the said bars.

5. In combination, an ice-box having its bottom formed with bars spaced apart by openings, the open space between two of the said bars being of greater area than the open spaces between the other of the bars, and an ice-receiving and overflow tank having an open uninterrupted top arranged directly below said enlarged open space, the top edge of said tank being positioned at a point removed from the lower face of the bottom of the ice-box, thereby permitting the overflow from the tank to be discharged between the top edge of the walls of the tank and the bottom of the ice-box.

6. The combination of an ice-box having its bottom provided with an enlarged opening, a conductor-pan arranged below the bottom of said ice-box and having an opening registering with the enlarged opening in the bottom of the box, and an ice-receiving and overflow tank having an open top arranged below the opening in the conductor-pan.

7. The combination of an ice-box having its bottom provided with an enlarged opening, a conductor-pan arranged below the bottom of said ice-box and having an opening registering with the enlarged opening in the bottom of the box, and an ice-receiving and overflow tank independent of said pan and having an open top arranged below the opening in the conductor-pan.

8. The combination with a car having a loading-chamber, of an ice-box arranged at one end of the car and having a perforated front wall for establishing communication between said chamber and the ice-box, said ice-box having its bottom provided with an enlarged opening, a conductor-pan positioned below the bottom of said ice-box and having an enlarged opening arranged below the opening in the bottom of the ice-box, an ice-receiving and overflow tank having an open uninterrupted top arranged below the opening in said pan, said tank separated from the pan by a space, and a drip-pan arranged below said tank and having a suitable outlet.

9. A car having a loading-chamber, an ice-box arranged at one end thereof and provided in its bottom with an opening, a conductor-pan provided with a marginal flange, said conductor-pan arranged below the bottom of the ice-box and having an opening therein, one wall thereof formed with a depending flange, the opening in said conductor-pan positioned below the opening in the bottom of the ice-box, and an ice-receiving and overflow tank positioned below said conductor-pan so as to form a space between the said pan and the top edge of the tank.

10. The combination of an ice-box having the rear, front and side walls provided with openings and its bottom formed with spaced bars, the spaces between two pairs of said bars being greater than the spaces between the other of said bars, and an ice-receiving and overflow tank having an open uninterrupted top arranged directly below each of said enlarged spaces, the top edge of said tanks being positioned at a point removed from the bottom of the bars forming thereby a space to allow of the overflow of the tanks discharging between the tanks and the bars.

11. The combination of an ice-box having its bottom formed of spaced bars, the spaces between two of said bars being greater than the space between the other of said bars, a conductor-pan for supporting said bars, said conductor-pan provided with an opening positioned below the enlarged space between the said bars, and an ice-receiving and overflow tank having an open uninterrupted top arranged directly below the opening in said conductor-pan, said tank positioned at a point removed from the bottom of said conductor-pan.

12. The combination of an ice-box having its bottom formed of spaced bars, the space between two of said bars being greater than the space between the other of said bars, a conductor-pan for supporting said bars, said conductor-pan provided with an opening positioned below the enlarged space between the said bars, an ice-receiving and overflow tank having an open uninterrupted top arranged directly below the opening in said conductor-pan, said tank positioned at a point removed from the bottom of said conductor-pan, a drip-pan positioned below said tank and having an outlet, a trap communicating with the outlet of the drip-pan, and a conductor-pipe attached to the outlet of the trap.

13. The combination with a refrigerating-chamber, of an ice-box having openings in the front thereof, thereby establishing direct communication between the interior of the chamber and the ice-box, said box further provided with an enlarged opening in its bottom, and an ice-receiving and overflow tank having closed sides, bottom and an open uninterrupted top arranged directly below the said opening in the bottom of the ice-box whereby said tank serves to maintain the final portion of the charge of ice afloat adjacent the bottom of the ice-box and exposed to the circulation of the air from the refrigerating-chamber.

14. The combination with a loading-chamber, of an ice-box arranged in the upper portion of said chamber and having openings for the free circulation of air between said chamber and said ice-box, said ice-box having its bottom open to permit the free passage therethrough of large, unbroken blocks of ice, and an ice-receiving and overflow tank located beneath said ice-box, said tank being closed against overflow except at its upper part and having an open top arranged immediately beneath the open bottom of the ice-box to receive the unbroken blocks of ice passing therethrough, whereby the water within said tank shall serve to hold the final portion of the charge of ice afloat adjacent the bottom of the ice-box and exposed to the circulation of air from the refrigerating-chamber.

15. The combination with a refrigerating-chamber, of means for receiving and storing the ice, comprising an ice-box having an enlarged bottom opening, and a subjacent ice-receiving and overflow tank having unobstructed communication with the bottom of said ice-box, whereby large, unbroken blocks of ice may be delivered to said tank; said ice-box having openings communicating with the refrigerating-chamber for free circulation of air and said tank being closed against escape of water except at its top; said tank serving, when filled with water, to maintain the final portion of the charge of ice afloat adjacent the bottom of the ice-box; a partition in the refrigerating-chamber arranged in front of said ice-box and tank with openings at the top and bottom to compel the circulation of air therearound and through the ice-box and against the face of the tank, and a drip-pan beneath said tank to catch the overflow therefrom.

16. A car having a refrigerating-chamber, and means for receiving and storing the ice comprising an elevated ice-box open at its front to the refrigerating-chamber and having a plurality of enlarged bottom openings to permit the free passage therethrough of large, unbroken blocks of ice, and a plurality of individual ice-receiving and overflow tanks located beneath the bottom openings of said ice-box and having uninterrupted communication therewith, whereby said blocks of ice may be stacked from the bottoms of said tanks to the top of the ice-box, said tanks being closed against overflow except at their tops to hold the final portion of the ice charge afloat adjacent the bottom of the ice-box; and means above the adjacent top edges of said tanks to direct the ice and drip-water thereto.

OSCAR M. STIMSON.

Witnesses:

GEO. P. FISHER, JR.,

KATHARINE GULACH.